United States Patent [19]

Chun

[11] Patent Number: 5,405,162
[45] Date of Patent: Apr. 11, 1995

[54] VEHICLE SUSPENSION SYSTEM FOR STEERABLE WHEEL

[75] Inventor: Dongee Chun, Kyungsangnam, Rep. of Korea

[73] Assignee: Hyundai Motor Company, Seoul, Rep. of Korea

[21] Appl. No.: 99,582

[22] Filed: Jul. 30, 1992

[30] Foreign Application Priority Data

Jul. 31, 1993 [KR] Rep. of Korea .................. 92-13842

[51] Int. Cl.⁶ .............................................. B60G 11/00
[52] U.S. Cl. ................................... 280/660; 280/691; 280/675
[58] Field of Search ............... 280/660, 688, 691, 675, 280/673, 696, 690

[56] References Cited

U.S. PATENT DOCUMENTS

| | | | |
|---|---|---|---|
| 3,551,990 | 1/1921 | Wehner | 280/673 X |
| 3,883,152 | 5/1975 | de Carbon | 280/675 X |
| 4,440,420 | 4/1984 | Müller | 280/660 X |
| 4,705,292 | 11/1987 | Haspalt et al. | 280/691 X |
| 4,878,688 | 11/1989 | Kubo | 280/691 X |
| 5,026,091 | 6/1991 | Lee | 280/675 |
| 5,114,175 | 5/1992 | Sakai | 280/691 X |
| 5,116,076 | 5/1992 | Moll | 280/691 |

Primary Examiner—Kenneth R. Rice
Assistant Examiner—Christopher P. Elle
Attorney, Agent, or Firm—Birch, Stewart, Kolasch & Birch

[57] ABSTRACT

This invention is directed to a vehicle suspension system for a steerable wheel, the vehicle having a front side, a rear side, a left side, a right side and a longitudinal axis. The suspension system includes a steering knuckle for rotatably supporting a wheel; an upper arm having a pair of front and rear arms connecting an upper part of the steering knuckle to a vehicle body, the wheel side connecting part of the front arm being formed by being displaced at a predetermined space in the vehicle body side direction as compared with the wheel side connecting part of the rear arm, the vehicle body side connecting part of the arm having a predetermined height higher than that of the rear arm; a lower arm for connecting a lower part of the steering knuckle to the vehicle body; and a strut assembly standingly formed on an upper surface of the lower arm, the strut assembly having a shock absorber and a spring coaxially mounted with the shock absorber.

4 Claims, 4 Drawing Sheets

VEHICLE SUSPENSION SYSTEM FOR STEERABLE WHEEL

BACKGROUND OF THE INVENTION

1. Field of the Invention

The present invention relates to a vehicle suspension system for a steerable wheel and more particularly, to a vehicle suspension system for a steerable wheel which can improve running safety, handling safety and ride comfort by easily defining an imaginary kingpin and increasing a free lay out degree with respect to a change in camber and caster angles.

2. Description of the Related Art

In general, a vehicle suspension system for a steerable system connects an axle shaft and a vehicle body to each other and controls a position of a wheel with respect to the vehicle body to obtain a better positioning in a vehicle motion. The axle shaft is thereby prevented from directly transmitting impacts or vibrations from a road surface to the vehicle body, so that there can be obtained an optimal handling safety, a reduction in damage to baggage, and an improved ride comfort.

Particularly in steerable front suspension, the suspension should be designed to absorb vibrations or impacts from the road surface as well as obtain running safety by maintaining an optimal position during a vehicle's straight travelling and maintaining a handling safety during a vehicle's turning.

The front wheel is mounted to be turned in its direction from right to left or from left to right, centering the king axis, and is also mounted with a geometrical angle to meet the requisite for the front suspension.

Mounting the front wheel with the geometrical angle is called wheel alignment. The wheel alignment is determined by several elements, but the optimal operation of the front wheel is, however, achieved by the supplemental operation of the elements with respect to each other. A kingpin inclination among the elements reduces a handling force of a steering wheel with a camber, absorbs any impact generated from the vehicle motion and then increases a restitution force of the steering wheel. The running safety of the straight ahead position of the vehicle and the handling safety in a vehicle's turning position are thereby obtained.

The kingpin inclination is such that the kingpin is mounted with its center line lying at a predetermined angle with respect to the vertical line when the vehicle is viewed from the front. The interval between the center line of the kingpin and the center line of the wheel is called spindle offset. The offset at the wheel center has an effect on the motion of vehicle when a driving force and an engine brake are applied to the wheel. The offset at the ground has an effect on the handling safety when vehicle brakes and turns. If the offset at the ground is decreased, the sensitivity with respect to the steering is decreased, in the same manner as the handling safety is increased when the vehicle brakes and turns.

When the steerable wheel moves up and down, the change in the camber angle and the tread should be small, so that better straight ahead safety can be obtained.

Referring to FIG. 7A, there is shown a general double Wishbone type suspension system. In this suspension system, a pair of upper arms 53 are connected to the upper parts of the knuckle 52 supporting the wheel. The car body side ends of the pair of upper arms 53 which are spaced from each other along the longitudinal direction with respect to vehicle body are connected to the car body. A pair of lower arms 54 connect to the lower part of the knuckle 52 with the vehicle body. A lower end of a strut assembly shock absorber system 55, is connected to the intermediate location of the lower arm 54.

Accordingly, the up-down vibrations applied to the front wheel are absorbed by the strut assembly. The upper and lower arms 53 and 54 are pivoted upward and downward on the hinge point of their car body side ends.

However, the location of ball joints where the outer ends of the upper and lower arms are connected to the knuckle is fixed. The kingpin axis K is formed by a line connecting the ball joint of the upper arm to that of the lower arm. This kingpin axis is always fixed, so that, in accordance with mechanical characteristics, installation of the kingpin axis, the camber angle, the tread, and the height of roll center are substantially restricted.

At the time of the up-down vibrations which are generated when the vehicle is turning or running on an uneven road, the changes in the camber angle and the tread show the opposite characteristics to each other. Accordingly, since the more the camber angle is changed, the more the tread is changed, and the ride comfort deteriorates. If the change in the tread is small, that of the camber angle is also small, resulting in a deterioration of handling safety.

Namely, the changes in the camber angle and the tread have a great effect on the ride safety and the handling safety. In a conventional suspension system, a connection of the upper arm to the knuckle is performed by a fixing point such as one ball joint, so that, the camber and the tread can be alternatively installed due to its structure.

SUMMARY OF THE INVENTION

Therefore, the present invention has been made in an effort to solve the above-described problems.

The primary object of the present invention is to provide a vehicle suspension system for a steerable wheel which can improve running safety, cornering safety and ride comfort by easily defining an imaginary kingpin and increasing a free lay out degree with respect to the change in camber and caster angles.

To achieve the above object, the present invention provides a vehicle suspension system for steerable wheel, the vehicle having a front side, a rear side, a left side, a right side and a longitudinal axis, the suspension system comprising: a steering knuckle for rotatably supporting a wheel; an upper arm having a pair of front and rear arms connecting a upper part of the steering knuckle to a vehicle body, the wheel side connecting part of the front arm being formed by being displaced at a predetermined space in the vehicle body side direction as compared with the wheel side connecting part of the rear arm, the vehicle body side connecting part of the arm having a predetermined height higher than that of the rear arm; a lower arm for connecting a lower part of the steering knuckle to the vehicle body; and a strut assembly standingly formed on an upper surface of the lower arm, the strut assembly having a shock absorber and a spring coaxially mounted with the shock absorber.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENTS

Figure 1:
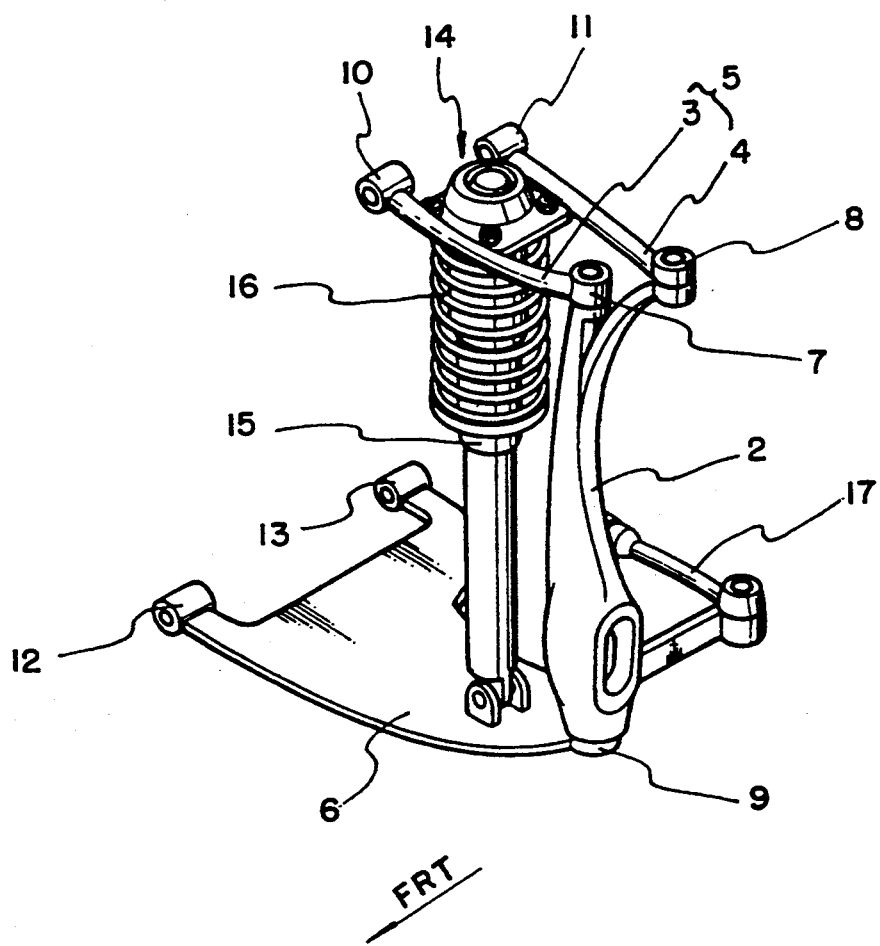
FIG. 1 is a perspective view of a suspension system of the invention.
Figure 2:
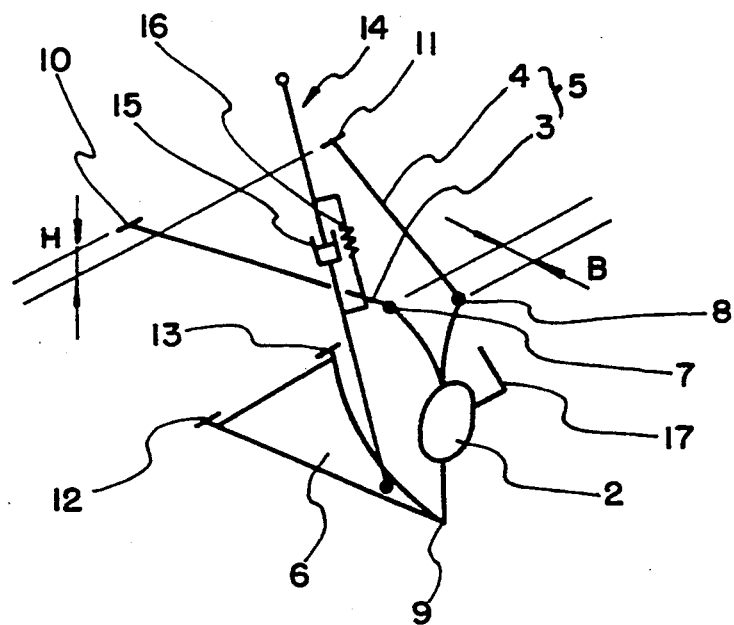
FIG. 2 is a view illustrating a structure of a suspension system of the invention.

FIGS. 1 and 2 are views illustrating one embodiment of the present invention, in which an upper arm 5 including a pair of front and rear arms 3 and 4, respectively, and a lower arm 6 formed to be in an A-shape are connected to the upper and lower parts of a steering knuckle 2 rotatably supporting a front wheel by ball joints 7, 8 and 9.

When positioning the front and rear arms 3 and 4, a wheel side ball joint part 7 to which the front arm 3 is connected is formed by being displaced at B in a vehicle body side direction as compared with a wheel side ball joint 8 to which the rear arm 4 is connected.

Vehicle body side connecting parts 10 and 11 of the front and rear arms 3 and 4 which are spaced from each other along the longitudinal direction with respect to a vehicle body are connected to the vehicle body by elastic bushes. At that time, the length of front arm 3 is as small as a difference B between the above connecting parts 7 and 8 aria a vehicle body side end of the front arm 3 has a predetermined higher height H than that of the rear arm 4.

The wheel side ball joints 7 and 8 of the front and rear arms 3 and 4 are positioned in the same plane.

The lower arm 6 which has an A-shape is connected to the lower part of the steering knuckle 2 by way of the ball joint 9. Vehicle body connecting parts 12 and 13 of the lower arm 6 are connected to the vehicle body by way of elastic bushes.

The elastic bushes for connecting parts 10 and 13 use a slip bushing in order that the upper and lower arms 5 and 6 can be co-rotated with the steering knuckle 2 during cornering.

On the upper surface of the lower arm 6 is standingly formed a strut arm 14 having a shock absorber 15 and a spring 16 coaxially mounted with the shock absorber 15 to absorb up-down vibrations.

A reference numeral 17 indicates a tie-rod for steering.

Figure 3:
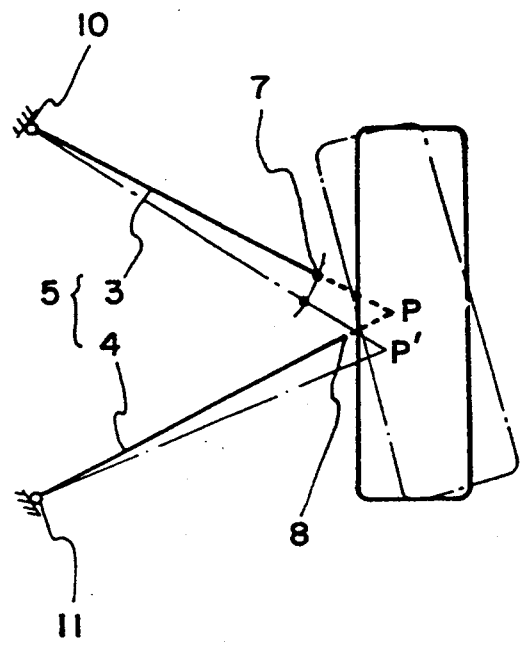
FIG. 3 is a view illustrating an operation of a suspension system of the invention.

FIGS. 3 through 7 are views illustrating an operational effect of an embodiment of the present invention. FIG. 3 is a view showing an operation of an outer wheel with respect to the cornering direction during cornering.

Figure 4:
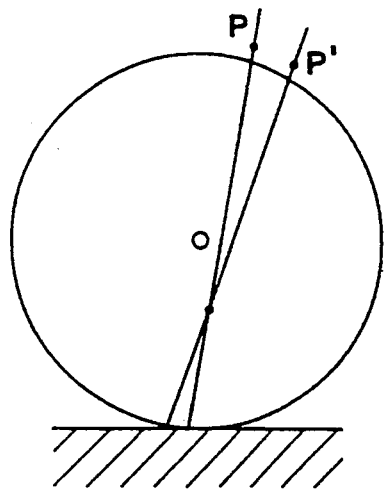
FIG. 4 is a side sectional view illustrating a displacement of a caster angle of the invention.

When steering the front wheel left, the wheel side ends of the front arm 3 and rear arm 4 are rotated backward with each other to be steered. At that time, since the front arm 3 has shorter length than the rear arm 4, an imaginary point P of these arms 3 and 4 is inwardly and rearwardly displaced to a position P' as shown in FIG. 3 and FIG. 4.

Figure 5:
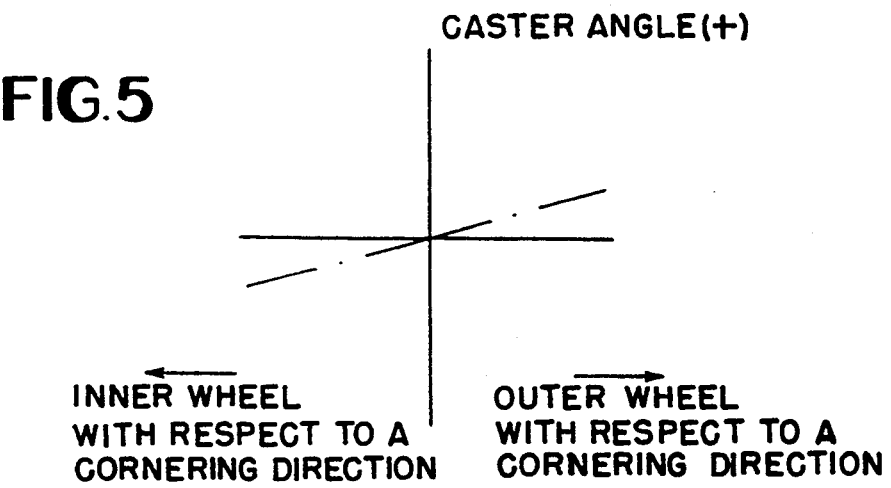
FIG. 5 is a graph illustrating a displacement of a caster angle of the invention.

As shown in FIG. 5, if the imaginary point P of the upper arm 5 is rearwardly and inwardly displaced during cornering, the caster angle of the outer wheel with respect to the cornering direction is changed to a positive (+) caster angle and the imaginary point P of the upper arm 5 is rearwardly and outwardly displaced. Thus, the caster angle of an inner wheel with respect to the cornering direction is changed to a negative (−) caster angle.

Figure 6:
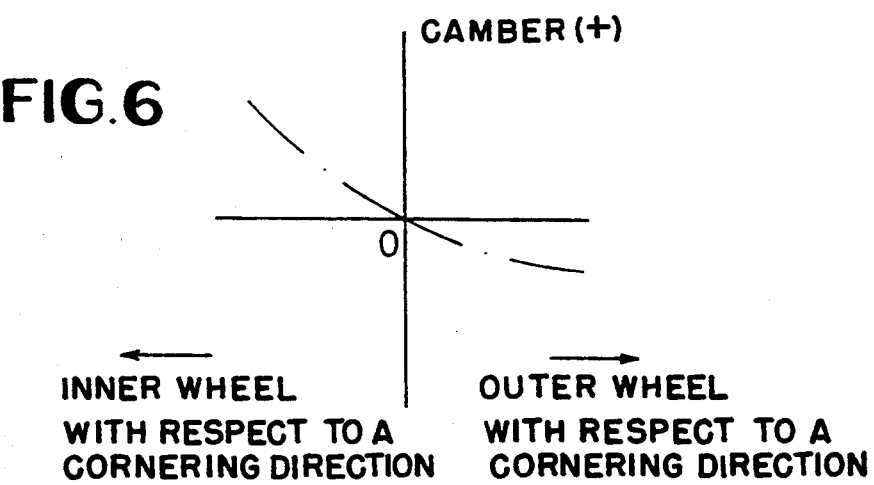
FIG. 6 is a graph illustrating a displacement of a camber angle of the invention.
Figure 7A:
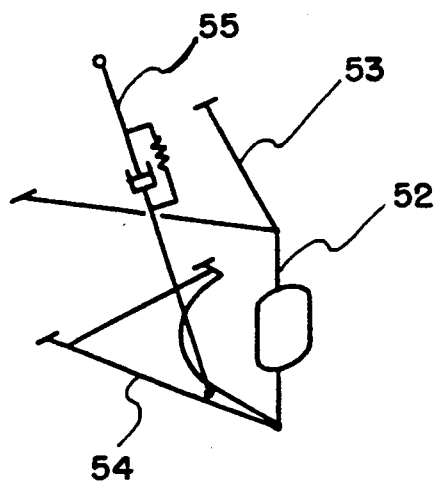
FIG. 7A is a view illustrating a structure of a conventional suspension system.
Figure 7B:
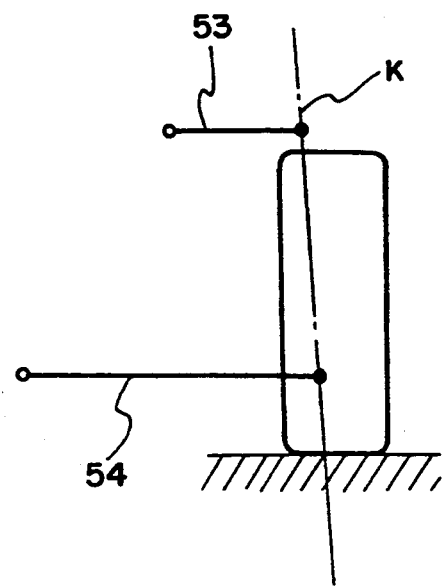
FIG. 7B is a view illustrating a conventional kingpin axis.

In accordance with the change of the caster angle, the camber angle is changed. As shown in FIG. 6, the camber angle of the inner front wheel with respect to the cornering direction is changed to a positive (+) camber and that of the outer front wheel with respect to the cornering direction is changed to a negative (−) camber. At cornering, if the caster angle is greatly changed, the camber angle is also greatly changed whereby the straight ahead safety and the cornering safety for the vehicle can be improved.

Namely, when the vehicle is running straight ahead, the change of the camber and the tread is small thereby obtaining the improved straight ahead safety and at cornering, in accordance with the change of the caster angle, the camber angle is changed thereby obtaining the improved cornering safety. As a result, the straight ahead safety and the cornering safety can be obtained, respectively.

In the upper arm 5, the connecting location of the front arm 3 to the vehicle body is more or less higher than that of rear arm 4 to the vehicle body, so that the anti-dive and anti-lift characteristics can be improved.

The difference in the length B of the front and rear arms 3 and 4 and the of the height H of these arms 3 and 4 can be varied in accordance with applied suspension systems.

Thus, the present invention is to provide the vehicle suspension system for the steerable wheel which can improve the running safety, the cornering safety and the ride comfort by easily defining the imaginary kingpin and increasing the free lay out degree with respect to the change in the camber and caster angles.

What is claimed is:

1. A vehicle suspension system for steerable wheel, the vehicle having a front side, a rear side, a left side, a right side and a longitudinal axis, the suspension system comprising:

a steering knuckle for rotatably supporting a wheel;

an upper arm having a pair of front and rear arms connecting an upper part of said steering knuckle to a vehicle body, a wheel side connecting part of the front arm being formed by being displaced in the vehicle body side direction as compared with the wheel side connecting part of the rear arm, the vehicle body side connecting part of the front arm having a predetermined height higher than that of said rear arm;

a lower arm for connecting a lower part of the steering knuckle to the vehicle body; and a strut assembly standingly formed on an upper surface of said lower arm, said strut assembly having a shock absorber and a spring coaxially mounted with the shock absorber.

2. The vehicle suspension system as set forth in claim 1, wherein the wheel side connecting parts of the front and rear arms lie in the same horizontal plane.

3. The vehicle suspension system as set forth in claim 1, wherein the lower and upper arms are each connected to said steering knuckle by way of a ball joint, respectively.

4. The vehicle suspension system as set forth in claim 1, wherein the lower and upper arms are each connected to the vehicle body by a slip bushing, respectively.

* * * * *